US012710845B1

(12) United States Patent
Gao et al.

(10) Patent No.: US 12,710,845 B1
(45) **Date of Patent: *Aug. 18, 2026**

(54) SYSTEM FOR STYLUS INPUT LATENCY COMPENSATION

(71) Applicant: AMAZON TECHNOLOGIES, INC., Seattle, WA (US)

(72) Inventors: Shuang Gao, Saratoga, CA (US); Jim Oommen Thomas, Kenmore, WA (US); Jingyi Zhang, Sunnyvale, CA (US); Songyao Jiang, Newton, MA (US); Junwu Luo, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/090,846

(22) Filed: Mar. 26, 2025

Related U.S. Application Data

(63) Continuation of application No. 18/307,397, filed on Apr. 26, 2023, now Pat. No. 12,293,040.

(51) Int. Cl.
*G06F 3/041* (2006.01)
*G06F 3/0354* (2013.01)

(52) U.S. Cl.
CPC ........ *G06F 3/0418* (2013.01); *G06F 3/03545* (2013.01)

(58) Field of Classification Search
CPC .. G06F 3/03545; G06F 3/0412; G06F 3/0418; G06F 3/044; G06F 3/0442; G06F 3/046; G06F 2203/04106
See application file for complete search history.

(56) References Cited

U.S. PATENT DOCUMENTS

| | | | | |
|---|---|---|---|---|
| 2014/0152576 A1* | 6/2014 | Kim | G06F 3/0412 | 345/169 |
| 2014/0253521 A1* | 9/2014 | Hicks | G06F 3/03545 | 345/179 |
| 2019/0042009 A1* | 2/2019 | Kumar | G06F 3/038 | |

* cited by examiner

*Primary Examiner* — Nelson M Rosario
(74) *Attorney, Agent, or Firm* — Athorus, PLLC

(57) ABSTRACT

A stylus provides input via a touchscreen comprising a touch sensor and a display. Latency between placement of a stylus tip and corresponding presentation of visual indicia on the display is reduced or eliminated by determining a predicted path of the stylus tip during a stroke. Visual indicia is presented on the display, based on the predicted path. Inputs from the touch sensor may include hover events associated with detection of the tip while not in contact with the touchscreen and touch events associated with presence of the tip on the touchscreen. A machine learning network may be trained to determine the predicted path. A portion of the network may be trained to accept dynamic-length sequences of events and generate fixed length sequences, reducing subsequent network complexity. A hand may be detected and used to determine the predicted path. The end of a stroke may be predicted, reducing overshoot.

20 Claims, 5 Drawing Sheets

SYSTEM FOR STYLUS INPUT LATENCY COMPENSATION

PRIORITY

This application is a continuation of, and claims priority to, U.S. patent application Ser. No. 18/307,397, filed on Apr. 26, 2023, entitled "STYLUS INPUT LATENCY COMPENSATION SYSTEM", which is hereby incorporated by reference in its entirety.

BACKGROUND

A touchscreen comprising a touch sensor and a display may experience latency between input on the touch sensor and presentation on the display.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
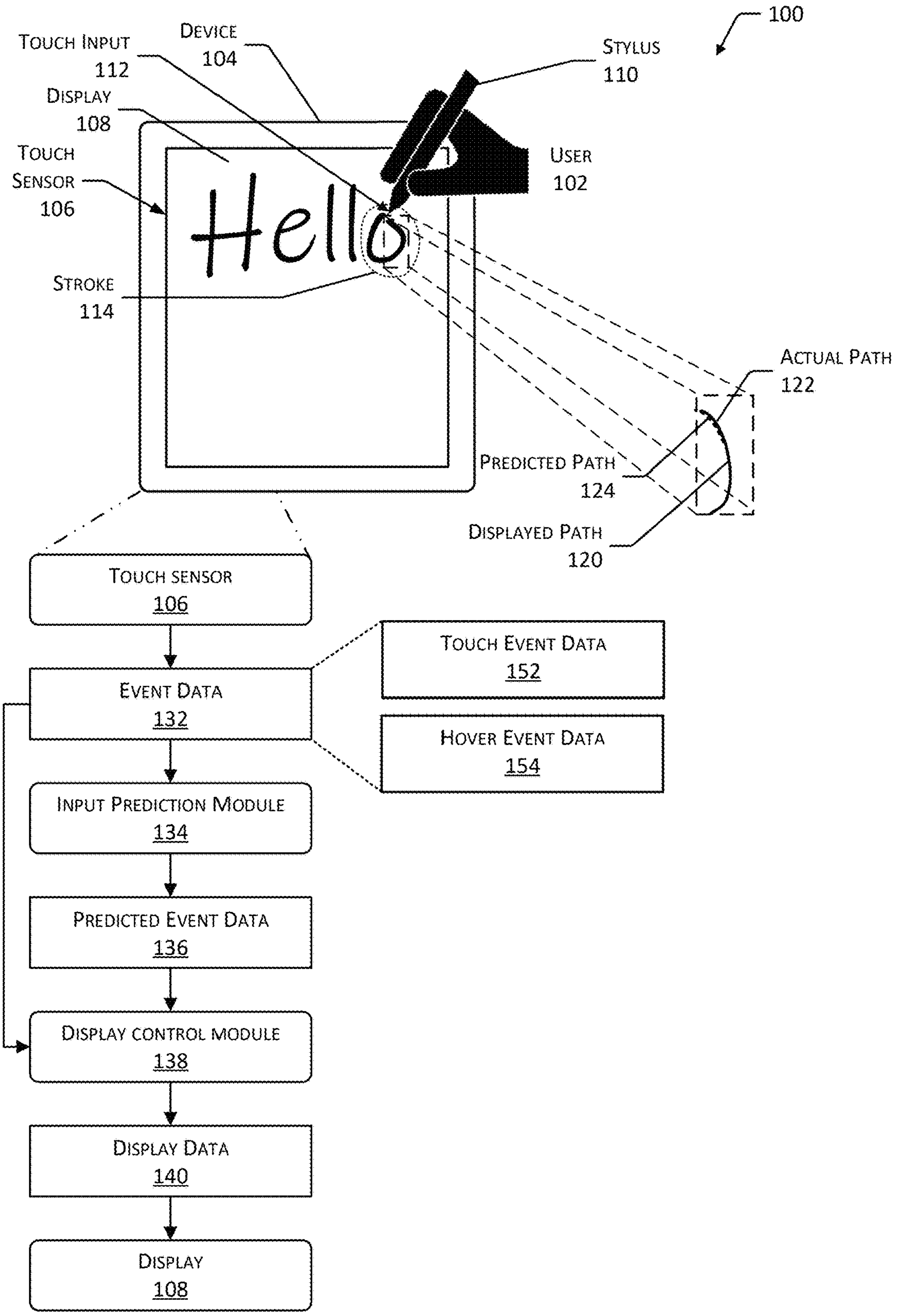
FIG. 1 illustrates a device including a touch sensor with an input prediction to mitigate display latency, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

A touchscreen comprising a touch sensor and a display may experience latency between input on the touch sensor and presentation on the display. The source of this latency may be attributed to one or more causes. In one instance, latency may result from delays associated with processing the input and sending instructions to the display to present visual indicia. In another instance, latency may result from delays associated with operation of the display itself, such as resulting from a delay to change a pixel from one state to another. Regardless of the cause, this latency causes a poor user experience and may adversely affect usability. For example, if the user is providing input data to a software application such as an email application or word processor, the latency may make it difficult for the user to adjust their movements to create a desired entry.

A stylus may be used to provide more precise inputs, for the convenience of the user, or other reasons. The stylus may be active, in that it contains electronics that may operate in conjunction with the touch sensor to provide input. The stylus may have a stylus tip that, during use, is intended to come into contact with a portion of the touchscreen. For example, during use the stylus tip may touch a glass or plastic cover layer of the touchscreen. The touch sensor provides as output event data indicative of coordinates at particular times. Event data may include one or more of touch events or hover events.

Touch events indicate coordinates at particular times of the stylus tip that is in contact with the touchscreen. In comparison, in some implementations the stylus may be detected above or before coming into contact with the portion of the touchscreen. Hover events indicate coordinates at particular times of the stylus tip that is not in contact with, but is detected by, the touch sensor of the touchscreen.

During use of the stylus, the user may enter a stroke. A stroke may comprise an entire glyph, a portion of a glyph, or some other inputs such as part of an illustration being created by the user. For example, an English cursive letter "e" may be expressed in a single stroke, while a Chinese character may comprise several strokes. Each stroke may comprise a sequence of a set of coordinates. The coordinates may be specified with respect to the touch sensor, the display, the overall touch sensor, and so forth. In some implementations, a stroke may comprise a sequence that begins with the stylus coming into contact with the touchscreen and concludes with the stylus no longer being in contact with the touchscreen, such as characterized by touch events. In other implementations, a stroke may begin or end before contact, such as characterized by hover events. In still other implementations, a stroke may include both touch and hover events.

Described in this disclosure are techniques for using event data to determine a predicted path of a stroke. Once determined, the predicted path may be used to determine display data that presents visual indicia, such as a line, on a display device along the predicted path. During operation, the use of the predicted path to present the visual indicia reduces the effective latency between a user providing input using the stylus and output on the display device. The predicted path may also be used to determine input data. For example, one or more strokes may be interpreted as input data of a particular character or selection of a particular control. The input data may then be provided to one or more of the operating system, an application, and so forth.

One or more machine learning networks may be trained to accept the event data and provide predicted event data as output. These network(s) may be trained using training data comprising stroke data associated with input from one or more human languages, human input, and so forth. For example, the training data may comprise stroke data associated with entry of English characters, Chinese characters, and so forth. The training data may include label information such as hand used to provide the input, language in use, and so forth. In some implementations, during training a loss function may determine a loss value based on a distance variation and deviation angle.

The one or more machine learning networks may also accept additional input during operation. For example, a classifier may be used to determine which hand is being used. Based on this, a particular latent vector or other information may be retrieved and provided as input. In another example, information about the configuration of the device may be provided as input, or used to determine additional input that is provided to the one or more machine learning networks.

The one or more machine learning networks may be trained to perform the following operations. A first portion of the one or more machine learning networks may process event data and determine embedding vector data representative of the events. A second portion of the network may accept as input variable length sequences of embedding vectors and determine as output a fixed length sequence of intermediate data. A third portion of the network may accept as input the intermediate data and provide as output predicted output data. By processing the variable length sequences into a fixed length sequence, the computational complexity associated with the third portion of the network is substantially reduced.

In some implementations, the predicted output data may comprise a set of events that are further processed to determine predicted event data for subsequent use. In one implementation, the set of events in the predicted output data may be processed using a regression algorithm to determine a set of future event coordinates. A confidence prediction module may determine confidence data associated with instances of the set of future event coordinates, indicating the confidence of the respective ones of the set. A stroke classifier may accept as input the predicted output data and determine stroke data that indicates if respective instances are associated with a stroke or not. The future event coordinate data, confidence data, and stroke data may be used to determine the predicted event data. For example, the predicted event data may comprise a sequence of the future event coordinates that have confidence greater than a threshold and are deemed to be part of the stroke.

By using the techniques and systems described in this disclosure, apparent latency between user input on a touchscreen is substantially reduced. This improves overall usability and user experience. The system as implemented on an end user device is computationally efficient, and may be readily used on a device with limited computational resources.

Illustrative System

FIG. 1 illustrates at 100 a user 102 using a device 104. The device 104 may comprise a tablet computer, smartphone, laptop, kiosk, and so forth. The device 104 includes a touch sensor 106. The touch sensor 106 may comprise a force sensitive touch sensor, capacitive touch sensor, optical touch sensor, ultrasonic touch sensor, and so forth. A display 108 comprises a device that, during operation, presents visible output. The display 108 may comprise a liquid crystal display, light emitting diode(s), electrophoretic display, and so forth. In some implementations, the touch sensor 106 and the display 108 may be combined into a single assembly that may be referred to as a touchscreen.

The user 102 may utilize a stylus 110 or other utensil to provide touch input 112 via the touch sensor 106. The stylus 110 may be used to provide more precise inputs, for the convenience of the user 102, or other reasons. The stylus 110 may be active, in that it contains electronics that may operate in conjunction with the touch sensor 106 to provide input. In other implementations, the stylus 110 may be passive or inert. A passive stylus 110 may comprise one or more components that operate in conjunction with sensors or electronics of the touch sensor 106. For example, a passive stylus 110 may comprise a magnet or conductive coil. In another example, an inert stylus 110 may consist of one or more pieces of material that provide structural or aesthetic functions.

The stylus 110 may have a stylus tip that, during use, is intended to come into contact with a portion of the touchscreen. For example, during use the stylus tip may touch a glass or plastic cover layer of the touchscreen. The touch sensor provides as output event data indicative of coordinates at particular times. Event data may include one or more of touch events or hover events.

During use of the stylus 110, the user 102 may enter a stroke 114. A stroke 114 may comprise an entire glyph, a portion of a glyph, or some other inputs such as part of an illustration being created by the user 102. For example, an English cursive letter "e" may be expressed in a single stroke 114, while a Chinese character may comprise several strokes 114. Each stroke 114 may comprise a sequence or time series of a set of coordinates. The coordinates may be specified with respect to the touch sensor 106, the display 108, and so forth. In some implementations, a stroke 114 may comprise a sequence that begins with the stylus 110 coming into contact with the touchscreen and concludes with the stylus 110 no longer being in contact with the touchscreen, such as characterized by touch events. In other implementations, a stroke 114 may begin or end before contact, such as characterized by hover events. In still other implementations, a stroke 114 may include both touch and hover events. For example, a stroke 114 may be begin with a first hover event as the tip of the stylus 110 is proximate to the touch sensor 106, continues through the touch events, and concludes with a second hover event as the tip of the stylus 110 moves away from the touch sensor 106.

During operation, the touch sensor 106 provides event data 132 as output. The event data 132 may comprise one or more of touch event data 152 or hover event data 154. The event data 132 may comprise data indicative of a set of coordinates of a tip of the stylus 110 and a timestamp associated with the set of coordinates. In some implementations, the event data 132 may include other information, such as orientation of the stylus 110, pressure of the stylus 110 on the touch sensor 106, velocity of the stylus 110, acceleration of the stylus 110, and so forth. The orientation may be indicative of an angular value with respect to one or more axes. For example, the orientation may indicate a rotation with respect to a longitudinal axis of the stylus 110. In another example, the orientation may indicate a tilt of the stylus 110 comprising an angle between the longitudinal axis and a line that is perpendicular or normal to a plane of the touch sensor 106. In yet another example, the orientation may indicate a projection direction of the stylus 110 comprising an angle in the plane of the touch sensor 106 between a reference direction and a projection of the stylus 110 onto the plane.

The touch event data 152 may comprise data from the touch sensor 106 that is associated with contact between the stylus 110 and the device 104. For example, the touch event data 152 may be indicative of events in which the tip of the stylus 110 is in contact with a cover of the touchscreen.

In comparison, the hover event data 154 may comprise data from the touch sensor 106 that is associated with the stylus 110 being proximate to, but not in contact with, the device 104. For example, the hover event data 154 may be indicative of events in which the tip of the stylus 110 approaches but does not touch a cover of the touchscreen.

An input prediction module 134 may accept as input event data 132 and provide as output predicted event data 136. The predicted event data 136 may comprise the predicted set of coordinates, the predicted timestamp associated with those coordinates, and may also comprise additional predicted information such as a predicted orientation, predicted pressure, and so forth. The input prediction module 134 may comprise one or more machine learning networks. The input prediction module 134 is discussed in more detail in the following figures.

As shown with regard to FIG. 1, a display path 120 is shown. The displayed path 120 may comprise the visual indicia as presented on the display 108. The displayed path 120 may comprise the previous path followed by the stylus 110 with respect to the touch sensor 106 from a first time to a second time. Also shown is an actual path 122 indicative of the path followed by the tip of the stylus 110 from the second time to a third time is shown as a light gray line. A predicted path 124 is also shown indicated as a broken line. The predicted path 124 may comprise the path indicated by the predicted event data 136. In some circumstances, the predicted path 124 may deviate from the actual path 122, such as depicted here.

The predicted event data 136, indicative of the predicted path 124, may be provided to a display control module 138. The display control module 138 may determine display data 140. The display data 140 may comprise instructions or other information that are used to present a particular visual indicia using the display 108. The display control module 138 may use the display data 140 to operate the display 108 to present the visual indicia.

The display control module 138 may also determine display data 140 based on the event data 132. For example, the display control module 138 may determine display data 140 that presents a visual indicia, such as a line, where the stylus 110 was as indicated by the event data 132 and where the stylus 110 is predicted to be based on the predicted event data 136.

In some implementations the display control module 138 may modify the displayed path 120 based on subsequently received event data 132. For example, the display control module 138 may operate the display 108 to present the predicted path 124 at a first time. Later, the actual path 122 as indicated by subsequent event data 132 may be presented at a second time. In some implementations a visual effect such as a fade, slow apparent movement, change in color, and so forth may be used to transition presentation of visual indicia from the predicted path 124 to the actual path 122. For example, the predicted path 124 may be presented as a blue line while the actual path 122 may be presented as a black line. In another example, first visual indicia associated with the predicted path 124 may appear to slide or shift until it merges with second visual indicia associated with the actual path 122.

Figure 2:
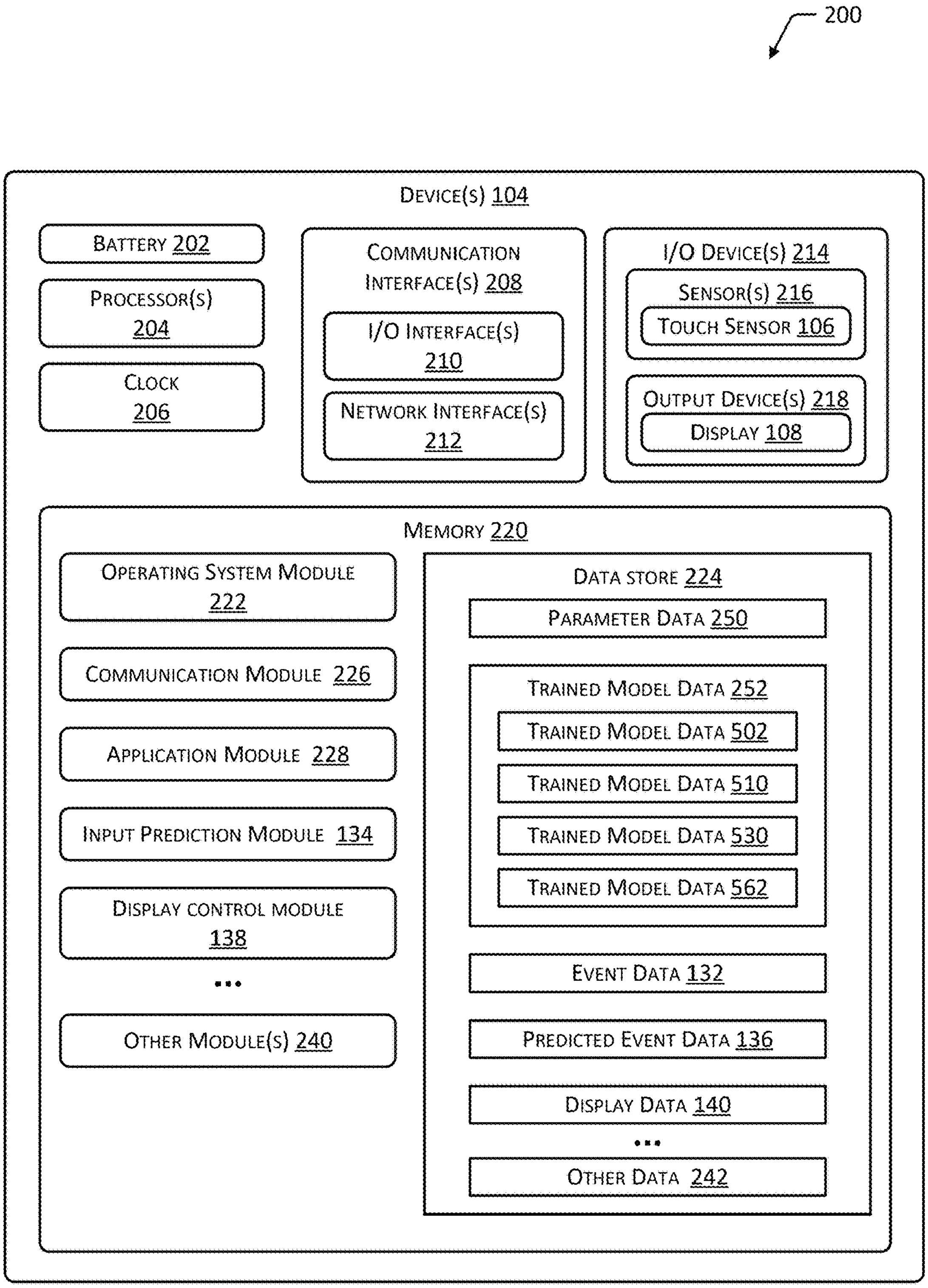
FIG. 2 is a block diagram of a device to implement the input prediction, according to some implementations.

FIG. 2 is a block diagram 200 of the device 104, according to some implementations. The device 104 may include a battery 202, power supply, or other device to provide electrical power suitable for operating the components in the device 104. In other implementations, the other devices may include one or more of capacitors, fuel cells, photovoltaic cells, wireless power receivers, conductive couplings suitable for attachment to a power source such as provided by an electric utility, and so forth.

The device 104 may include one or more hardware processors 204 (processors) configured to execute one or more stored instructions. The processors 204 may comprise one or more cores. One or more clocks 206 may provide information indicative of date, time, ticks, and so forth. For example, the processor 204 may use data from the clock 206 to associate a particular interaction with a particular point in time.

The device 104 may include one or more communication interfaces 208 such as input/output (I/O) interfaces 210, network interfaces 212, and so forth. The communication interfaces 208 enable the device 104, or components thereof, to communicate with other devices or components. The communication interfaces 208 may include one or more I/O interfaces 210. The I/O interfaces 210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 210 may couple to one or more I/O devices 214. The I/O devices 214 may include sensors 216 such as the touch sensor 106 or other input devices such as a keyboard, microphones, mouse, scanner, and so forth. The I/O devices 214 may also include output devices 218 such as one or more of the display 108, printer, audio speakers, and so forth. In some embodiments, the I/O devices 214 may be physically incorporated with the device 104 or may be externally placed.

The network interfaces 212 may be configured to provide communications between the device 104 and other devices, such as routers, access points, and so forth. The network interfaces 212 may include devices configured to couple to personal area networks (PANs), local area networks (LANs), wireless local area networks (WLANS), wide area networks (WANs), and so forth. For example, the network interfaces 212 may include devices compatible with Ethernet, Wi-Fi, Bluetooth, and so forth.

The device 104 may also include one or more buses or other internal communications hardware or software that allow for the transfer of data between the various modules and components of the device 104.

As shown in FIG. 2, the device 104 includes one or more memories 220. The memory 220 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 220 provides storage of computer-readable instructions, data structures, program modules, and other data for the operation of the device 104. Several functional modules are shown stored in the memory 220, although the same functionality may alternatively be implemented in hardware, firmware, or as a system on a chip (SoC).

The memory 220 may include at least one operating system (OS) module 222. The OS module 222 is configured to manage hardware resource devices such as the communication interfaces 208, the I/O devices 214, and provide various services to applications or modules executing on the processors 204. The OS module 222 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 220 may be a data store 224 and one or more of the following modules. These modules may be executed as foreground applications, background tasks, daemons, and so forth. The data store 224 may use a flat file, database, linked list, tree, executable code, script, or other data structure to store information. In some implementations, the data store 224 or a portion of the data store 224 may be distributed across one or more other devices including other computing devices 106, network attached storage devices, and so forth.

A communication module 226 may be configured to establish communications with the device 104, servers, other computing devices, or other devices. The communications may be authenticated, encrypted, and so forth.

One or more application modules 228 may provide various functionality. For example, a first application module 228 may comprise a web browser, a second application module 228 may comprise an email application, and so forth.

The input prediction module 134 may be stored in the memory 220. During operation, the input prediction module 134 may accept as input the event data 132 and determine the predicted event data 136 as described in the following figures. The input prediction module 134 may provide input data that is provided to one or more of the OS module 222, one or more application modules 228, and so forth. For example, the predicted event data 136 may indicate the user 102 activating a control icon, resulting in input data indicative of that activation. The input data indicative of that activation may be provided to the application module 228 that is associated with the control icon.

The display control module 138 accepts as input the predicted event data 136 and generates display data 140. The display control module 138 may accept data from other modules. For example, the display control module 138 may receive data from one or more of the application modules 228. The display 108 is operated based on the display data 140.

The data store 224 may store parameter data 250, trained model data 252, event data 132, predicted event data 136, display data 140, and so forth. The parameter data 250 may comprise one or more parameters associated with operation of the device 104. For example, the parameter data 250 may specify a language selection indicative of a human language for presentation of a user interface.

The trained model data 252 may comprise weight values, bias values, threshold values, or other information associated with particular nodes or functions of a machine learning network. The input prediction module 134 comprises one or more machine learning networks. Once trained, the input prediction module 134 may be used to determine predicted event data 136 for subsequent use.

The trained model data 252 may comprise one or more of weight values, bias values, or other information associated with operation of a machine learning network or portion thereof. The trained model data 252 may be determined during training, such as described with regard to FIG. 5. For example, the trained model data 252 may comprise one or more of trained model data 502, 510, 530, or 562.

Other modules 240 may also be present in the memory 220 as well as other data 242 in the data store 224.

Figure 3:
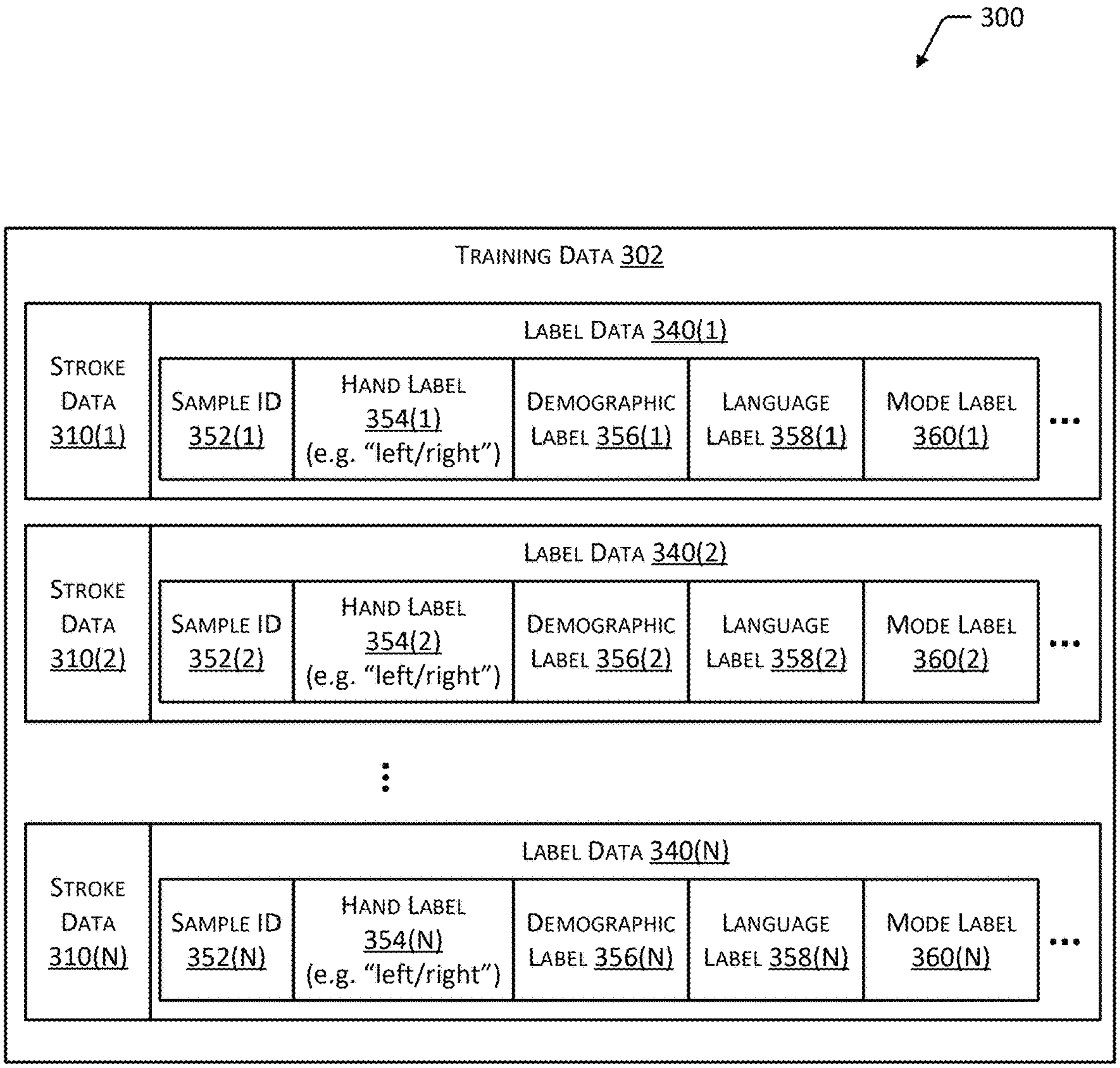
FIG. 3 illustrates training data that is labeled for training of an input prediction module, according to some implementations.

FIG. 3 illustrates at 300 training data 302 that is labeled for training the input prediction module 134, according to some implementations. The training data 302 comprises a plurality of samples of stroke data 310(1), 310(2), . . . , 310(N). Each sample of stroke data 310 may comprise a sequence of event data 132. Each sample of stroke data 310 may comprise information associated with one or more strokes 114. For example, each sample of stroke data 310 may be representative of an individual stroke 114.

The information associated with each sample of stroke data 310 may comprise actual data acquired from users 102 who have opted in to provide information for training, synthetic input data, or a combination thereof. The synthetic input data may comprise synthetic data that is consistent with actual data. For example, the synthetic input data may comprise output from a generative adversarial network (GAN) that has been trained to produce synthetic stroke data 310. In some implementations, the synthetic input data may be based on actual input data. In other implementations, other techniques may be used to determine the synthetic input data.

Each sample of stroke data 310 in the training data 302 is associated with label data 340. The label data 340 may comprise information such as one or more of a sample identifier (ID) 352, hand label 354, demographic label 356, language label 358, mode label 360, and so forth.

The sample ID 352 indicates a particular training stroke. The sample ID 352 may be used to distinguish one training stroke from another.

The hand label 354 may be indicative of the hand of the user 102 that is associated with the stroke data 310. For example, the hand label 354 may indicate "left" or "right".

The demographic label 356 may be indicative of one or more demographics associated with the user 102 that is associated with the stroke data 310.

The language label 358 may be indicative of the language associated with the stroke data 310. For example, the language label 358 may indicate the stroke data 310 was associated with English, Chinese, Arabic, or another language.

The mode label 360 may be indicative of an entry mode associated with the stroke data 310. For example, the model label 360 may be indicative of whether the stroke data 310 was associated with a text entry mode, drawing entry mode, and so forth.

Figure 4:
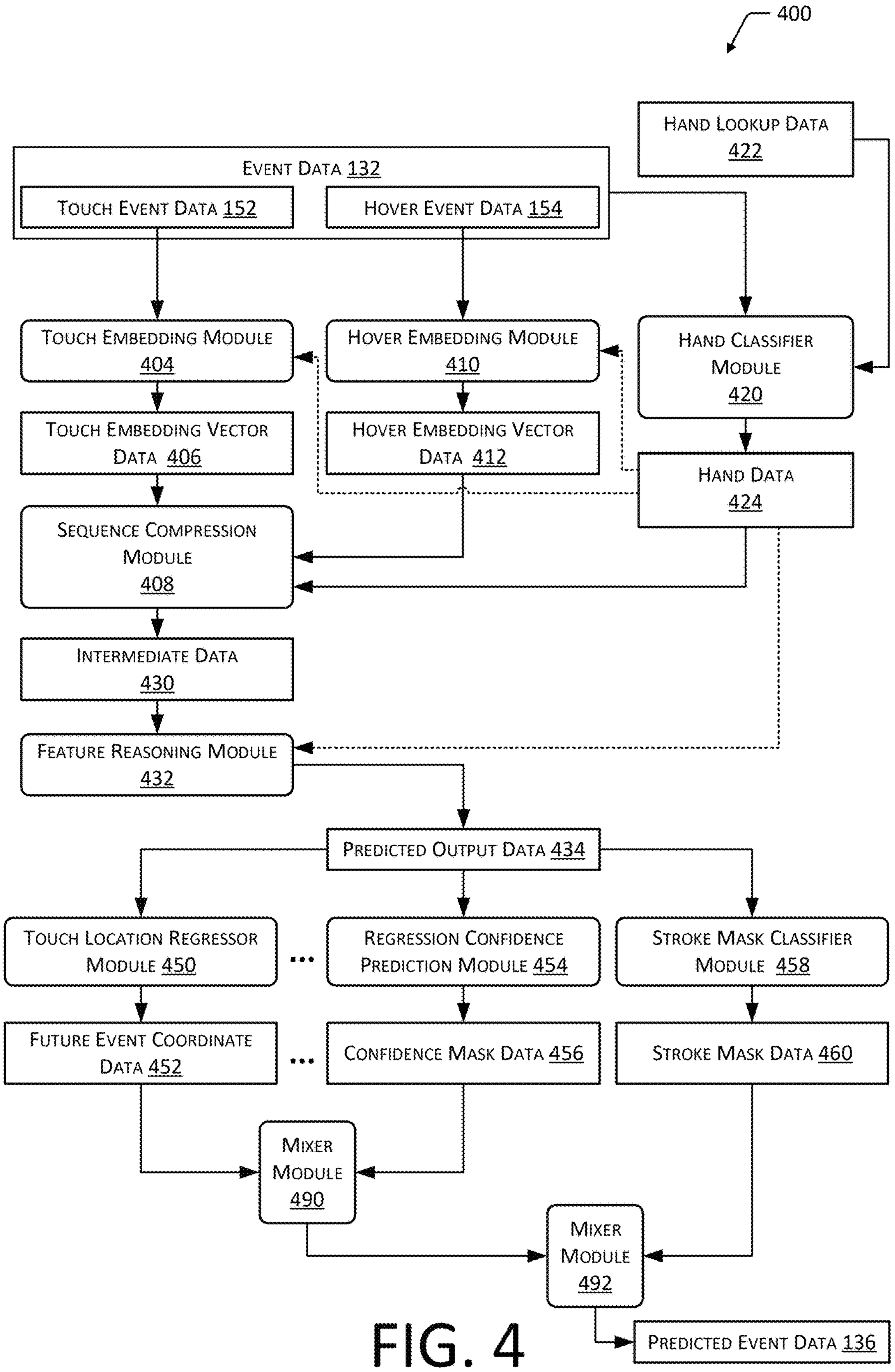
FIG. 4 illustrates an input prediction module, according to some implementations.

FIG. 4 illustrates at 400 the input prediction module 134, according to some implementations. The input prediction module 134 may comprise instructions stored in the memory 220 and executed on the one or more processors 204.

Event data 132 may be processed by trained embedding modules to determine embedding vector data. In the implementation depicted here, touch event data 152 may be processed by a touch embedding module 404 to determine touch embedding vector data 406. The touch embedding module 404 may comprise a trained machine learning network or portion thereof. The touch embedding vector data 406 may be provided to a sequence compression module 408.

Also depicted in this implementation, is hover event data 154 that may be processed by a hover embedding module 410 to determine hover embedding vector data 412. The hover embedding module 410 may comprise a trained machine learning network or portion thereof. The hover embedding vector data 412 may be provided to the sequence compression module 408. In some implementations, the hover event data 154 and associated portions of the system, such as the hover embedding module 410, may be omitted.

The event data 132 associated with a stroke 114 may comprise sequences of varying length. For example, a short stroke 114 may be described by a sequence of 15 instances of event data 132 while a long stroke 114 may have a longer sequence of 47 instances of event data 132. The sequence compression module 408 accepts as input embedding vector data which may have a variable sequence length and provides as output a fixed length sequence of intermediate data 430. Continuing the earlier examples, the sequence compression module 408 may accept the short stroke 114 as input and provide as output first intermediate data 430 having a sequence length of 13, and then accept the long stroke 114 as input and provide as output second intermediate data 430 also having a sequence length of 13. The sequence compression module 408 may comprise a trained machine learning network or portion thereof. For example, the sequence compression module 408 may comprise a machine learning network comprising one or more convolutional layers. The process of convolution, pooling, attention, and so forth may produce the desired sequence compression.

In implementations, such as shown here, in which the sequence compression module 408 accepts both touch and hover events, the sequence compression module 408 may also fuse the information from these different event modalities. For example, the resulting intermediate data 430 may be based on one or more of the touch embedding vector data 406 or the hover embedding vector data 412.

In some implementations the sequence compression module 408 may also accept as input hand data 424. In some implementations, the event data 132 may be processed by a hand classifier module 420 that determines as output the hand data 424. For example, the hand classifier module 420 may determine whether the event data 132 is associated with a left or a right hand. Based on this determination, hand lookup data 422 may be retrieved and provided as the hand data 424. The hand lookup data 422 may comprise a latent vector or other data that is indicative of whether the event data 132 is associated with a left hand or a right hand of the user 102. In some implementations the latent vector stored in the hand lookup data 422 may be determined during training of one or more of the modules described herein.

In some implementations the system 100 may include other classifier modules (not shown) that may be used instead of or in addition to the hand classifier module 420. For example, a mode classifier may determine the mode of operation such as text entry mode, drawing entry mode, or other mode. Based on the mode, additional data may be determined. For example, data such as a latent vector may be retrieved from a lookup table, and subsequently provided to one or more modules.

In other implementations other data may be determined for input to one or more modules. For example, a currently existing application or operating system may provide information indicative of a human language currently selected for use by the device 104. Based on this information, additional data such as a latent vector may be retrieved and provided as input to one or more modules.

In some implementations the hand data 424 or other data from another classifier module may be provided as input to one or more other modules. For example, output from the hand data 424 or other classifier modules may be provided to one or more of the touch embedding module 404, the hover embedding module 410, the feature reasoning module 432, and so forth.

The intermediate data 430 comprising a fixed sequence length is provided as input to a feature reasoning module 432. The feature reasoning module 432 provides as output predicted output data 434 comprising a sequence of instances of coordinates and other information associated with touch sensor input. The feature reasoning module 432 may comprise a trained machine learning network or portion thereof. For example, the feature reasoning module 432 may implement one or more architectures such as convolutional neural networks, encoder-decoder networks, transformer networks, sequence to sequence "seq2seq" networks, ResNET, MobileNet, and so forth.

Because the feature reasoning module 432 is trained (as described with regard to FIG. 5) to process fixed length sequences, the training process may require fewer computational resources. During operation, such as shown here, the trained feature reasoning module 432 may be relatively compact, providing for relatively low operating latency. The bifurcation of the processing of the event data 132 between the sequence compression module 408 and the feature reasoning module 432 thus provides a substantial improvement in computational performance without sacrificing accuracy. For example, the bifurcation allows for a computational complexity of O(N) with regard to the sequence length N during both training and inference.

In some implementations, the predicted output data 434 may be used as the predicted event data 136 without further processing. In the implementation depicted here, the predicted output data 434 undergoes additional processing to determine the predicted event data 136. This additional processing may comprise one or more of using a regression algorithm to determine future event coordinate data 452, determining confidence mask data 456 associated with individual ones of the future event coordinate data 452, or determining stroke mask data 460 associated with individual instances of the predicted output data 434.

A touch location regressor module 450 may implement a regression algorithm that accepts as input the predicted output data 434 and provides as output future event coordinate data 452. For example, the regression algorithm may implement a linear regression, non-linear regression, and so forth. In some implementations, the regression algorithm may operate as an interpolator, predicting coordinates (or other attributes) that are within a range of values expressed in the sequence of predicted output data 434 used as input. In other implementations, the regression algorithm may operate as an extrapolator, predicting coordinates (or other attributes) that are outside of the range of values expressed in the sequence of predicted output data 434 used as input.

In other implementations, the input prediction module 134 may include additional regressor modules. For example, the event data 132 includes pressure data and a pressure regressor module may determine future event pressure data. In another example, the event data 134 may include tilt data and a tilt regressor module may determine future event tilt data.

A regression confidence prediction module 454 may implement a regression diagnostic algorithm that accepts as input the predicted output data 434 or, in some implementations, the future event coordinate data 452, and provides as output confidence mask data 456. The confidence mask data 454 may provide data indicative of a confidence in the correctness of an instance of the future event coordinate data 452. For example, a confidence value that is greater than a threshold value for a specified instance of the future event coordinate data 452 may be deemed sufficient to include the future event coordinate data 452 in determining the predicted event data 136. In contrast, a confidence value less than the threshold value may result in the specified instance of the future event coordinate data 452 being disregarded in determining the predicted event data 136. In some implementations, the regression diagnostic algorithm may determine a confidence interval that is associated with one or more instances of the future event coordinate data 452. In implementations in which additional regressors are used, confidence mask data 456 associated with those regressors may be determined and used. In some implementations, the confidence mask data 456 may comprise a binary mask, with each instance having either a first value or a second value.

A stroke mask classifier module 458 may implement a classifier or other machine learning algorithm that accepts as input the predicted output data 434 or, in some implementations, the future event coordinate data 452, and provides as output stroke mask data 460. The stroke mask data 460 may provide data indicative of whether an instance of the future event coordinate data 452 is associated with a stroke 114 or not. By determining the stroke mask data 460, the system is able to reduce or eliminate overshoot in which the predicted path 124 extends beyond a point where the stylus 110 was lifted from the touchscreen. In some implementations, the stroke mask data 460 may comprise a binary mask, with each instance having either a first value or a second value.

In the implementation depicted here, mixer modules 490 and 492 combine the future event coordinate data 452, the confidence mask data 456, and the stroke mask data 460 to determine the predicted event data 136. For example, a first mixer module 490 applies the confidence mask data 456 to the future event coordinate data 452, removing or disregarding instances of the future event coordinate data 452 that have insufficient confidence, to produce a first subset of the future event coordinate data 452. The first subset of the future event coordinate data 452 is then processed by a second mixer module 492 that applies the stroke mask data 460 to the first subset of the future event coordinate data 452, to produce the predicted event data 136. The predicted event data 136 may comprise a sequence of instances that may comprise the same type of information found in event data 132. For example, the predicted event data 136 may be indicative of the coordinates of a touch, orientation, pressure, velocity, acceleration, and so forth arranged in time sequential order.

As mentioned above, in other implementations other combinations may be used. For example, the regression confidence prediction module 454 may be omitted. In another example, the stroke mask classifier module 458 may be omitted.

Figure 5:
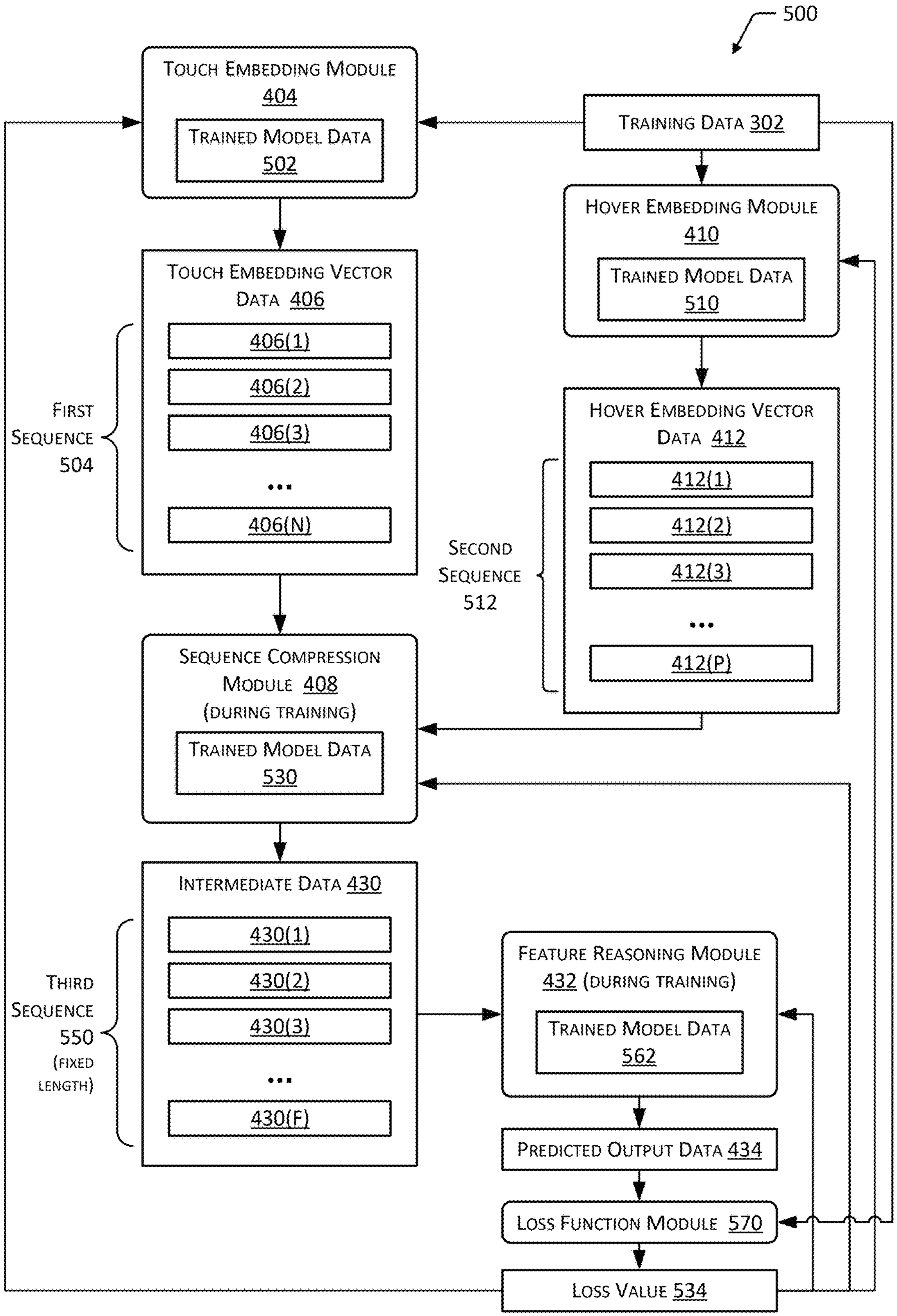
FIG. 5 illustrates a portion of the input prediction module during training, according to some implementations.

FIG. 5 illustrates at 500 a portion of the input prediction module 134 during training, according to some implementations. The input prediction module 134 may comprise one or more machine learning networks. The process of training the one or more machine learning networks determines the trained model data 252. The trained model data 252 may comprise weight values, bias values, threshold values, or other information associated with particular nodes or functions of a machine learning network or portion thereof.

In some implementations, the modules depicted in this figure may be associated with different machine learning networks, or with different portions of a single machine learning network. During different phases of training, one or more modules may be "frozen" in that their respective trained model data 252 remains unchanged while one or more other modules experience changes to their respective trained model data 252 based on a loss value. In some implementations additional loss functions, not shown, may be used to train particular modules. The operations described with regard to FIG. 5 may be performed on a computing device with additional computational resources. For example, one or more servers may be used to determine the trained model data 252.

During training, the training data 302 is provided as input to the input prediction module 134. For example, stroke data 310 representative of touch events may be provided to the touch embedding module 404 while stroke data 310 representative of hover events may be provided to the hover embedding module 410. During training the embedding modules may determine respective trained model data. For example, the touch embedding module 404 may determine trained model data 502 while the hover embedding module 410 may determine trained model data 510.

As mentioned with regard to FIG. 4, the touch embedding module 404 provides as output touch embedding vector data 406. In some implementations, the touch embedding module 404 may determine the trained model data 502 during training based on the loss value 534 described below. For each touch event in the stroke data 310, a respective instance of touch embedding vector data 406 may be provided as output. Because the stroke data 310 may vary in the number of events, the sequence length of strokes 114 represented by the stroke data 310 may vary. In this illustration a first sequence 504 comprises instances of touch embedding vector data 406(1), 406(2), . . . , 406(N).

As mentioned with regard to FIG. 4, the hover embedding module 410 provides as output hover embedding vector data 412. In some implementations, the hover embedding module 410 may determine the trained model data 510 during training based on the loss value 534 described below. For each hover event in the stroke data 310, a respective instance of hover embedding vector data 412 may be provided as output. Because the stroke data 310 may vary in the number of events, the sequence length of strokes 114 represented by the stroke data 310 may vary. In this illustration a second sequence 512 comprises instances of hover embedding vector data 412(1), 412(2), . . . , 412(P).

The sequence compression module 408 during training accepts the touch embedding vector data 406(1)-(N) and the hover embedding vector data 412(1)-(P), if available. In some implementations, the sequence compression module 408 may determine trained model data 530 during training based on the loss value 534 described below.

The sequence compression module 408 provides as output intermediate data 430. The sequence compression module 408 may be trained to produce as output a third sequence 550 comprising intermediate data 430(1), 430(2), . . . , 430(F) that has a fixed sequence length. For example, for a first instance of stroke data 310(1), N may equal 37, P may equal 17, and F may equal 13. Continuing the example, for a second instance of stroke data 310(2), N may equal 15, P may equal 5, and F may equal 13.

The feature reasoning module 432 during training accepts the intermediate data 430(1), 430(2), . . . , 430(F) and determines the predicted output data 434 as output. In some implementations, the feature reasoning module 432 may determine trained model data 562 during training based on the loss value 534 described next.

During training, a loss function module 570 may accept as input the predicted output data 434 and the training data 302 or a portion thereof to determine a loss value 534. In some implementations, the loss value 534 may provide data indicative of the variance between the predicted output data 434 and the training data 302.

In some implementations, the loss function module 570 may implement the following loss function. In other implementations, other loss functions may be used.

The machine learning network, or a portion thereof may be trained using a loss function representative of a linear combination of distance loss $L_{dist}$ and deviation angle loss $L_{ang}$, with term-balancing weights ($a_{dist}$, $a_{ang}$):

$$L = \alpha_{dist} \times L_{dist} + \alpha_{ang} \times L_{ang} \quad \text{EQUATION 1}$$

The distance loss $L_{dist}$ is defined as:

$$L_{dist} = \max(0, D_e - T_{dist}) \quad \text{EQUATION 2}$$

For these equations, let $T_{dist}$ be a constant threshold. Let $D_e$ be the aggregated distance error of a sample of stroke data 310. A penalty may then be specified when $D_e$ is larger than the threshold.

$D_e$ may be calculated using the Euclidean distance $d_i$ of N predicted events:

$$D_e = Aggr^{dist}_{i \in [1, \ldots N]}(d_i) \quad \text{EQUATION 3}$$

A deviation angle loss $L_{ang}$ may be defined as:

$$L_{ang} = \max(0, \theta_e - T_{ang}) \quad \text{EQUATION 4}$$

For these equations, let $T_{ang}$ be a constant threshold. Let $\theta_e$ be the aggregated deviation angle error of a sample of stroke data 310. A penalty may then be specified when $\theta_e$ is larger than the threshold.

Continuing, $\theta_e$ may be calculated by using the angle $\theta_i$ of N predicted events:

$$\theta_e = Aggr^{ang}_{i \in [1, \ldots N]}(\theta_i) \quad \text{EQUATION 5}$$

Term-balancing weights may be used to control the penalties associated with distance loss and deviation loss. In one implementation the weights may be constant. In another implementation the weights may be dynamic. As described next, training may be enhanced by penalizing losses based on their visual effects. For example, a distance error may be penalized according to deviation angle, and a deviation angle according to the distance error:

$$\alpha_{dist} = w \times F(\theta_e) \quad \text{EQUATION 6}$$

where w is a scalar between [0,1].

$$\alpha_{ang} = (1 - w) \times G(D_e) \quad \text{EQUATION 7}$$

where w is a scalar between [0,1].

Human eye perceptual studies may be used to determine the appropriate values. For example, a study may test increasing deviation angle errors by creating, presenting, and obtaining user feedback. The relationship between these may be expressed as:

$$F(\theta_e) = I(\theta_e \geq T_{ang}) \quad \text{EQUATION 8}$$

The loss function described above may comprise a linear combination in its outermost functional portion, and aggregation functions as a function of an inner portion. In other implementations this may be inverted. For example, the loss value 534 may be determined as an aggregation of each prediction's loss, and each prediction's loss may be a combination of the respective distance term and deviation angle term.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:

a touch sensor;

a display device;

one or more memories, storing first computer-executable instructions; and one or more hardware processors to execute the first computer-executable instructions to:

acquire, using the touch sensor, first event data comprising a first set of events associated with a first set of times;

determine first display data based on the first set of events;

present first visual indicia on the display device based on the first display data;

determine, using one or more trained machine learning networks to process the first event data, coordinate data, wherein the coordinate data is indicative of a predicted set of coordinates associated with a second set of times that are after the first set of times;

determine second display data based on the coordinate data; and present second visual indicia using the display device based on the second display data.

2. The system of claim 1, wherein the one or more trained machine learning networks comprises a first trained machine learning network and a second trained machine learning network; and the one or more hardware processors to further execute the first computer-executable instructions to:

determine, using the first event data and the first trained machine learning network, first data comprising a fixed sequence length of embedding vector data; and determine, using the first data and the second trained machine learning network, second data, wherein the coordinate data is based on the second data.

3. The system of claim 1, the one or more hardware processors to further execute the first computer-executable instructions to:

determine, using the first event data and a first classifier, hand data indicative of a hand associated with input to the touch sensor; and determine, using the one or more trained machine learning networks, the coordinate data based at least in part on the hand data.

4. The system of claim 1, the one or more hardware processors to further execute the first computer-executable instructions to:

determine mode data indicative of input associated with one or more of text or drawings; and determine, using the one or more trained machine learning networks, the coordinate data based at least in part on the mode data.

5. The system of claim 1, the one or more hardware processors to further execute the first computer-executable instructions to:

determine, using the one or more trained machine learning networks and the first event data, first data indicative of a predicted set of events associated with the second set of times; and wherein the coordinate data is determined using a regression algorithm and the first data.

6. The system of claim 1, the one or more hardware processors to further execute the first computer-executable instructions to:

determine, using the one or more trained machine learning networks and the first event data, first data indicative of the predicted set of coordinates associated with the second set of times; and determine, based on the first data, confidence data that is indicative of a confidence that respective ones of the predicted set of coordinates are correct predictions of a future touch event;

determine, based on the first data, stroke data that is indicative of a likelihood that respective ones of the predicted set of coordinates are part of a stroke; and wherein the coordinate data is determined using the first data and the stroke data.

7. The system of claim 1, the one or more hardware processors to further execute the first computer-executable instructions to:

determine input data based on the coordinate data; and providing the input data to one or more applications.

8. The system of claim 1, the one or more hardware processors to further execute the first computer-executable instructions to:

determine a second set of events associated with the second set of times using the one or more trained machine learning networks to process the first event data, wherein the second set of events represent a predicted set of events; and determine the coordinate data based on the second set of events.

9. A computer-implemented method comprising:

acquiring, using a touch sensor, first event data comprising a first set of events associated with a first set of times;

determining first display data based on the first set of events;

presenting first visual indicia on a display device based on the first display data;

determining, using one or more trained machine learning networks to process the first event data, coordinate data, wherein the coordinate data is indicative of a predicted set of coordinates associated with a second set of times that are after the first set of times;

determining second display data based on the coordinate data; and presenting second visual indicia on the display device based on the second display data.

10. The method of claim 9, wherein the first set of events are indicative of:

touch events associated with contact between a stylus tip and the touch sensor; and hover events associated with the stylus tip proximate to, but not in contact with, the touch sensor.

11. The method of claim 9, wherein the one or more trained machine learning networks comprises a first trained machine learning network and a second trained machine learning network; and the method further comprising:

determining, using the first event data and the first trained machine learning network, first data comprising a fixed sequence length of embedding vector data; and determining, using the first data and the second trained machine learning network, second data, wherein the coordinate data is based on the second data.

12. The method of claim 9, comprising:

determining, using the first event data and a first classifier, hand data indicative of a hand associated with input to the touch sensor; and determining, using the one or more trained machine learning networks, the coordinate data based at least in part on the hand data.

13. The method of claim 9, further comprising:

determining mode data indicative of input associated with one or more of text or drawings; and determining, using the one or more trained machine learning networks, the coordinate data based at least in part on the mode data.

14. The method of claim 9, further comprising:

determining, using the one or more trained machine learning networks and the first event data, first data indicative of a predicted set of events associated with the second set of times; and wherein the coordinate data is determined using a regression algorithm and the first data.

15. The method of claim 9, further comprising:

determining, using the one or more trained machine learning networks and the first event data, first data indicative of the predicted set of coordinates associated with the second set of times; and determining, based on the first data, confidence data that is indicative of a confidence that respective ones of the predicted set of coordinates are correct predictions of a future touch event; and determining, based on the first data, stroke data that is indicative of a likelihood that respective ones of the predicted set of coordinates are part of a stroke; and wherein the coordinate data is determined using the first data and the stroke data.

16. The method of claim 9, further comprising:

determining input data based on the coordinate data; and providing the input data to one or more applications.

17. The method of claim 9, the determining the coordinate data comprising:

determining a second set of events associated with the second set of times using the one or more trained machine learning networks to process the first event data, wherein the second set of events represent a predicted set of events; and determining the coordinate data based on the second set of events.

18. The method of claim 17, wherein the second set of events is indicative of:

the predicted set of coordinates with respect to one or more of the touch sensor or the display device; and one or more of:

an orientation of a stylus with respect to the one or more of the touch sensor or the display device, a pressure on the stylus, or a tilt of the stylus.

19. A system comprising:

a touch sensor;

one or more memories, storing first computer-executable instructions; and one or more hardware processors to execute the first computer-executable instructions to:

acquire, using the touch sensor, first event data comprising a first set of events associated with a first set of times;

determine, using one or more trained machine learning networks to process the first event data, a predicted set of events indicative of a predicted path with respect to the touch sensor, wherein the predicted set of events occur after the first set of times;

determine input data based at least in part on the predicted set of events; and provide the input data to one or more applications.

20. The system of claim 19, wherein the one or more trained machine learning networks comprises a first trained machine learning network and a second trained machine learning network; and the one or more hardware processors to further execute the first computer-executable instructions to:

determine, using the first event data and the first trained machine learning network, first data comprising a fixed sequence length of embedding vector data; and determine, using the first data and the second trained machine learning network, second data; and wherein the predicted set of events is based on the second data.

* * * * *